United States Patent [19]
Giordano

[11] Patent Number: 5,594,232
[45] Date of Patent: Jan. 14, 1997

[54] PLANAR ARRANGEMENT FOR TWO-DIMENSIONAL OPTICAL SCANNING

[75] Inventor: Joseph Giordano, Bayville, N.Y.

[73] Assignee: Symbol Technologies, Inc., Holtsville, N.Y.

[21] Appl. No.: 435,973

[22] Filed: May 5, 1995

[51] Int. Cl.⁶ ....................................... G06K 7/10
[52] U.S. Cl. ............................. 235/472; 235/467
[58] Field of Search ................................ 235/467, 472

[56] References Cited

U.S. PATENT DOCUMENTS

| 3,642,344 | 2/1972 | Corker . | |
|---|---|---|---|
| 3,666,974 | 5/1972 | Dostal . | |
| 4,302,709 | 11/1981 | Tichtinsky . | |
| 4,502,752 | 3/1985 | Montagu . | |
| 4,919,500 | 4/1990 | Paulsen . | |
| 5,168,149 | 12/1992 | Dvorkis et al. | 235/472 |
| 5,280,165 | 1/1994 | Dvorkis et al. . | |
| 5,373,148 | 12/1994 | Dvorkis et al. . | |

FOREIGN PATENT DOCUMENTS 60-107017A 6/1985 Japan .
2175705 12/1986 United Kingdom .

*Primary Examiner*—Harold Pitts
*Attorney, Agent, or Firm*—Kirschstein, et al.

[57] ABSTRACT

An optical scanner for reading indicia having part of differing light reflectivity, including an optical element and a mounting bracket. The optical element is mounted for oscillation with respect to the mounting bracket by first and second wires forming a first spring having a relatively high modulus of elasticity, the optical element having a relatively low inertia when oscillating by elastic movement of the first spring. A stationary frame is provided with the mounting bracket mounted for oscillation with respect to the frame by third and fourth wires having a relatively high modulus of elasticity; the optical element, mounting bracket and first and second wires taken together having a relatively high inertia when oscillating by elastic movement of the third and fourth wires. The optical element is oscillated with respect to the mounting bracket at a relatively high frequency, and the mounting bracket oscillated with respect to the frame at a relatively low frequency by an electromagnetic drive.

16 Claims, 3 Drawing Sheets

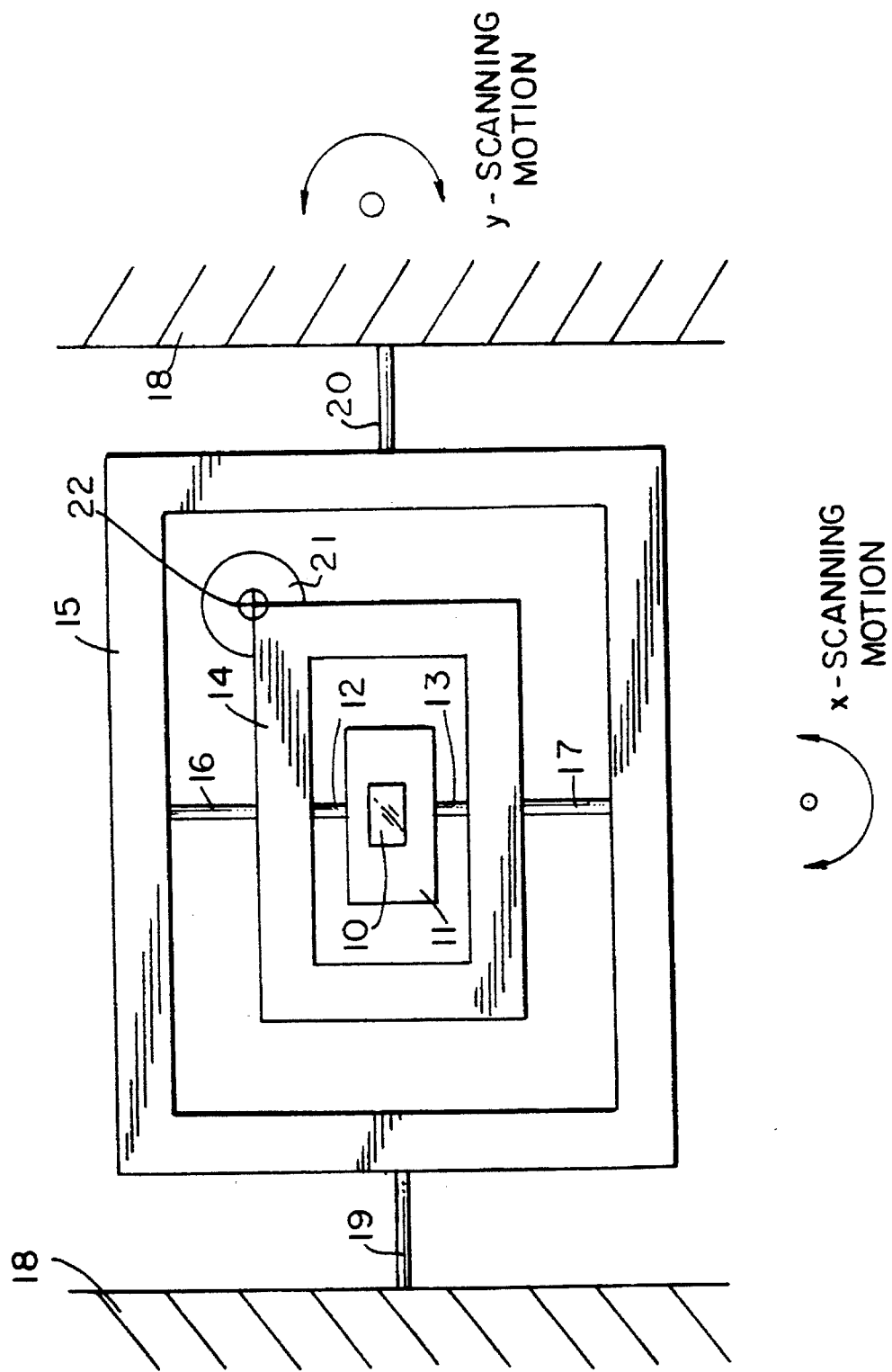

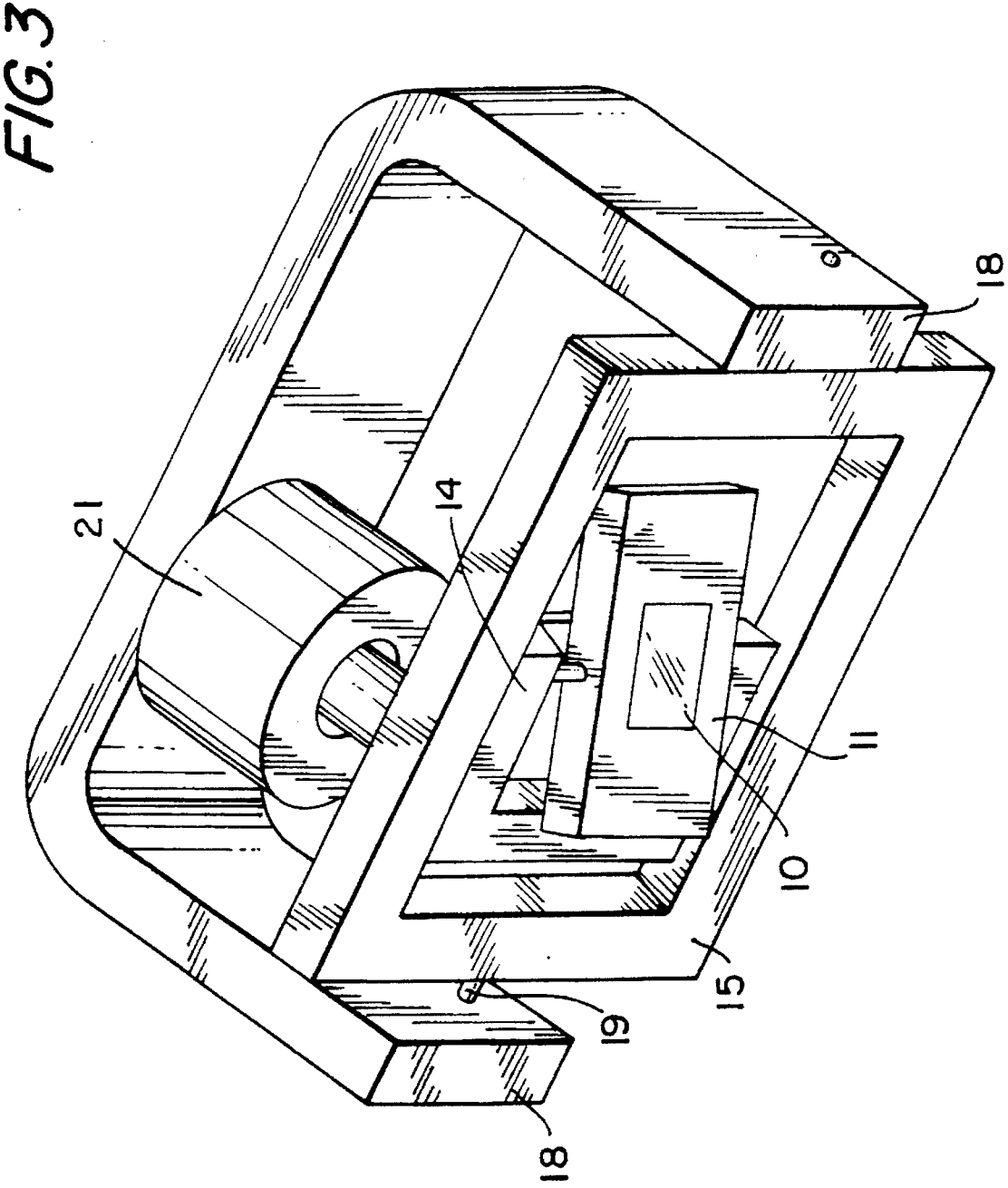

PLANAR ARRANGEMENT FOR TWO-DIMENSIONAL OPTICAL SCANNING

REFERENCE TO RELATED APPLICATIONS

This application is related to U.S. patent application Ser. No. 08/378,209 filed Jan. 25, 1995, which is a continuation-in-part of U.S. patent application Ser. No. 08/108,521 filed Jul. 19, 1993, which is a division of U.S. Ser. No. 07/868,401, now U.S. Pat. No. 5,280,165, which is a division of U.S. Pat. Ser. No. 07/520,464, now U.S. Pat. No. 5,168,149, which is a continuation-in-part of U.S. Ser. No. 07/428,770, now U.S. Pat. No. 5,099,110. This application is also related to U.S. patent application Ser. No. 08/326,328 filed Oct. 20, 1994, entitled Compact Bar Code Scanning Module with Shock Protection.

BACKGROUND OF THE INVENTION

1. Field of the Invention

The invention generally relates to an optical scanning arrangement for use in an optical scanner, for example a bar code reader.

2. Description of the Related Art

A typical optical scanner (for example a bar code reader) has a light source, preferably a laser light source, and means for directing the laser beam onto a symbol (for example a bar code symbol) to be read. On route to the symbol, the laser beam is generally directed onto, and reflected off, a light reflecting mirror of a scanning component. The scanning component causes oscillation of the mirror, so causing the laser beam repetitively to scan the symbol. Light reflected from the symbol is collected by the scanner and detected by a detector such as a photodiode. Decode circuitry and/or a microprocessor algorithm is provided to enable the reflected light to be decoded, thereby recovering the data which is represented by the bar code symbol.

In the type of scanner known as a two dimensional or 2D scanner, the scanning component causes the light beam to trace out a two dimensional path across the symbol to be read. The preferred pattern depends upon the nature of the symbols with which the scanner is to be used, but typical examples include Lissajous figures and raster patterns.

Two dimensional scanning patterns are generally produced by mounting the mirror on the scanning component in such a way as to permit it to oscillate in two perpendicular directions. Conventionally, separate drive mechanisms were required to produce oscillation in the x direction and in the y direction, but more recently scanning components have been devised which can provide the required two dimensional motion using only a single magnetic coil. Examples are shown in U.S. Pat. Nos. 5,168,149 and 5,280,165, both of which are assigned to the assignee of the current invention, and both of which are hereby incorporated by reference.

SUMMARY OF THE INVENTION

Objects of the Invention

It is an object of the present invention to provide a reliable, inexpensive arrangement for providing two dimensional scanning.

It is a further object to provide an arrangement in which the x direction scanning frequency may be very different from the y direction scanning frequency.

It is also an object of the invention to provide an indicia reader in which scanning motion is implemented using torsional oscillations of an optical element.

Additional objects, advantages and novel features of the present invention will become apparent to those skilled in the art from this disclosure, including the following detail description, as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of significant utility.

Features of the Invention

According to the present invention there is provided an optical scanning arrangement for use in a scanner for reading indicia having parts of differing light reflectivity, the arrangement comprising:

a) an optical element;

b) a mounting bracket, the optical element being mounted for oscillation, with respect to the mounting bracket by first and second wires having a relatively high modulus of elasticity, the optical element having a relatively low inertia when oscillating by elastic movement of the first and second wires; and c) a stationary frame, the mounting bracket being mounted for oscillation with respect to the frame by third and fourth wires having a relatively high modulus of elasticity; the optical element, mounting bracket and first and second wires taken together having a relatively high inertia when oscillating by elastic movement of the third and fourth wires; and, preferably d) driving means arranged to oscillate the optical element with respect to the mounting bracket at a relatively high frequency, and the mounting bracket with respect to the frame at a relatively low frequency.

The inertia referred to will, of course, depend upon the mass of the optical element in one case, as well as the disposition of that mass with respect to the first and second wires. In the second case, the inertia will depend upon the combined mass of the optical element, the mounting bracket and the first and second wires, along with the disposition of that mass with respect to the third and fourth wires.

The invention may be carried into practice in a number of ways, and specific embodiments will now be described, by way of example, with reference to the accompanying drawings. The novel features which are considered as characteristic of the invention are set forth in particular in the appended claims. The preferred features of the invention, however, both as to its construction and its method of operation, together with additional objects and advantages thereof, will best be understood from the following description, when read in conjunction with the drawings.

BRIEF DESCRIPTION OF THE DRAWINGS

FIG. 2 is a schematic view of an arrangement embodying the present invention; and FIG. 3 is a perspective view of an embodiment of a scanning arrangement according to the present invention.

DETAILED DESCRIPTION OF THE PREFERRED EMBODIMENTS

Figure 1:
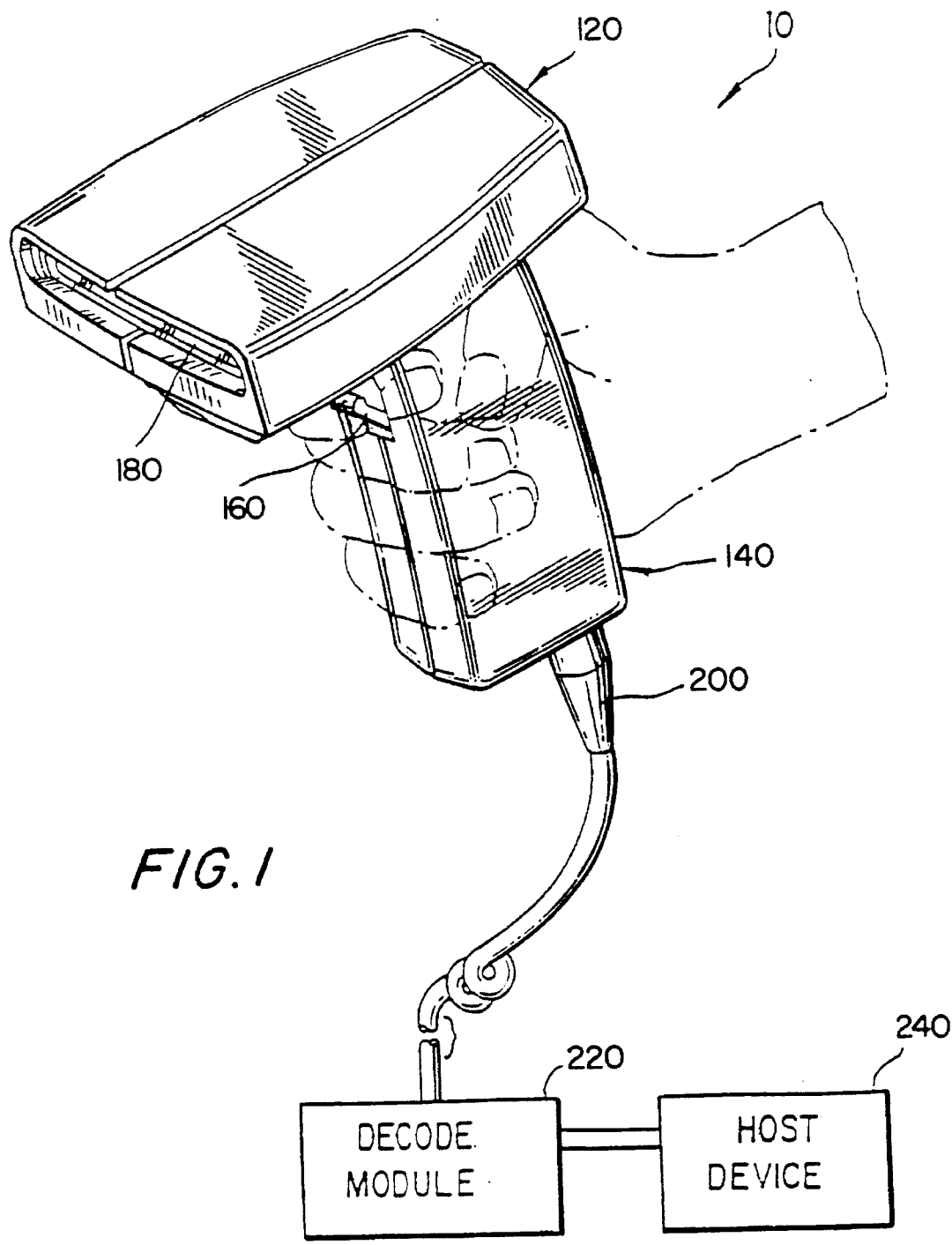
FIG. 1 is a front perspective view of a hand-held bar code reader incorporating the scanner according to the present invention.

Referring now to the drawings, as shown in FIG. 1, reference numeral 100 generally identifies a hand-held gun-shaped scanner head having a barrel 120 and a handle 140. The head need not be gun-shaped as any suitable configuration may be used, such as box-like. A manually-operable trigger 160 is situated below the barrel 120 on an upper, forward-facing part of the handle 140. As known from the above-identified patents and applications incorporated by reference herein, a light source component, typically, but not necessarily, a laser, is mounted inside the head 100. The light source emits a light beam along a transmission path which extends outwardly through a window 180 that faces indicia, e.g. bar code symbols, to be read. Also mounted within the head is a photodetector component, e.g. a photodiode, having a field of view, and operative for collecting reflected light returning through the window 180 along a return path from the symbol.

A scanner component is mounted within the head 100, and is operative for scanning the symbol and/or the field of view of the photodetector. The scanner component includes at least one light reflector positioned in the transmission path and/or the return path. The reflector is driven by an electrically-operated drive to oscillate in alternate circumferential directions, preferably at the resonant frequency of the scanner component.

The photodetector generates an electrical analog signal indicative of the variable intensity of the reflected light. This analog signal is converted into a digital signal by an analog-to-digital converter circuit. This digital signal is conducted, according to one embodiment, along an electrical cable 200 to a decode module 220 located exteriorly of the head 100. The decode module 220 decodes the digital signal into data descriptive of the symbol. An external host device 240, usually a computer, serves mainly as a data storage in which the data generated by the decode module 220 is stored for subsequent processing.

In operation, each time a user wishes to have a symbol read, the user aims the head at the symbol and pulls the trigger 160 to initiate reading of the symbol. The trigger 160 is an electrical switch that actuates the drive means. The symbol is repetitively scanned a plurality of times per second, e.g. forty (40) times per second. As soon as the symbol has been successfully decoded and read, the scanning action is automatically terminated, thereby enabling the scanner to be directed to the next symbol to be read in its respective turn.

In addition, the head need not be a portable hand-held type as fixedly mounted heads are also contemplated in this invention. Furthermore, the heads may have manually operated triggers or may be continuously operated by direct connection to an electrical source.

The oscillations need only last a second or so, since the multiple oscillations, rather than time, increase the probability of getting a successful decode for a symbol, even a poorly printed one. The resonating reflector has a predetermined, predictable, known, generally uniform, angular speed for increased system reliability.

Turning now to FIG. 2, there is shown, in purely schematic form, an embodiment of the scanner component of a bar code reader according to the present invention. As will immediately be evident from the drawing, this is not intended to be a practical embodiment, but rather to provide a basis for explaining the general concepts that make up the present invention.

As shown in FIG. 2, an optical element such as a mirror 10 is mounted for oscillation to a first mounting bracket 11. The first mounting bracket 11 is, in turn, mounted for oscillation on a second mounting bracket 14 by springs such as first and second wires 12, 13 constituted of high tensile steel wire. The springs 12, 13 allow the mirror 10 to oscillate in a first (x) direction with respect to the second bracket 14. The second bracket 14 is, in turn, mounted for oscillation on a third mounting bracket 15 by steel wire springs 16, 17 in the x direction. A third group of wire springs 19, 20 is arranged to allow the entire unit comprising the mirror, the springs 12, 13, 16, 17, and the first and second brackets 14, 15 to oscillate in a second (y) direction. A driver 21 provides an oscillatory force 22 which causes flexing of each of the springs, and hence movement of the optical element to produce deflection of a light beam of scanning in both the x and y directions.

One of the key distinguishing features of the present invention is that the brackets 11, 14 and 15 are flat, generally rectangularly shaped elements all lying in substantially the same plane when at rest.

Scanning in the x direction is relatively fast, by virtue of the springs 12, 13, 16 and 17 having a relatively high modulus of elasticity, and by virtue of the mass of the mirror 10 and the brackets 11 and 14 being relatively low. Oscillation in the y direction, on the other hand, is relatively slow by virtue of the combined masses of the first, second and third brackets, springs and mirror being relatively high.

The driving force 22 may comprise the superposition of two separate oscillatory signals, a high frequency signal to stimulate oscillation in the x direction, and a low frequency signal to stimulate oscillation in the y direction.

From the above description, it will accordingly be appreciated that the frequency of oscillation in the y direction depends upon the modulus of elasticity of the springs 19, 20, and on the total mass that has to be moved in the y direction; in this case, the combined mass of the brackets 11, 14, 15, the springs and the mirror 10. The frequency of oscillation in the x direction depends upon the length, diameter and the modulus of elasticity of the springs 12, 13, 16 and 17 and on the mass that has to be moved in the x direction which includes the mass of the mirror 10 and the brackets 11 and 14.

To be yet more specific, it will be appreciated by the skilled man that the x and y scanning frequencies depend, strictly speaking, not upon the respective masses but on the respective inertias. Since there is a certain element of rotation, as well as translation, when the springs flex, the actual dynamic characteristics of the arrangement may be slightly more complicated than has been indicated above. However, the general principles still apply, and it is easily within the skill of an artisan in the field to select the masses involved and the lengths, diameters, and moduli of elasticity to achieve the required frequencies of oscillation in the x and y directions.

A specific embodiment of a two-axis scan pattern arrangement is shown in FIG. 3, in which the scanning component, e.g. a light reflector or mirror 10 is fixedly mounted on bracket 11. An electromagnetic coil 21 is fixedly mounted to a chassis 18. Electrical input leads supply the energizing signal to the coil 21.

In certain applications, it is desirable to scan indicia with a raster-type scan pattern. In a raster-type scan pattern, a series of substantial horizontal and substantially parallel scan lines are produced from an upper horizontal scan line, proceeding downward with a multiplicity of intermediate horizontal scan lines, to a lower horizontal scan line in order to uniformly cover the desired scan area. In order to obtain a raster-type scan pattern, a mirror is arranged to vibrate in planes orthogonal to each other. As shown in FIG. 2, the mirror is mounted for angular oscillating movement, in first and second alternate circumferential directions, between first and second pairs of scan end positions. In addition, due to their respective shapes and positioning, the interior springs 16, 17 and 12, 13 will vibrate at a high range of frequencies, typically about 200–800 Hz, while the exterior springs 19, 20 will vibrate at a low range of frequencies, typically about 5–100 Hz. Preferably, these frequencies are 280 Hz and 20 Hz, respectively. The amplitude of vibration necessary to scan the symbol will depend on the size of the symbol and will typically be at least 5°–15° with respect to the plane of the brackets 11, 14, 15.

A raster-type scan pattern is automatically obtained by driving the coil 21 with a signal that is a superposition of two driving signals, one being within the high frequency range and the other being within the low frequency range. For example a 500 Hz square wave signal may be utilized to oscillate the optical component in the x direction and a 10 Hz sine wave signal may be utilized to oscillate the component in the y direction. The combination of the fast oscillations of the component in the x direction and the slow oscillations of the component in the y direction results in a raster-type scan pattern over the indicia. Preferably, the high frequency signal is frequency tuned to the resonant frequency of the exterior springs 19, 20.

In this arrangement, whenever the superimposed AC driving signal is supplied to coil 21, the coil cyclically draws the corner of the bracket 14. The high frequency component of the driving signal causes the spring 19, 20 to vibrate, preferably at the resonant frequency, causing the bracket 15 to be angularly oscillated between scanned positions. The low frequency component of the driving signal causes the springs 12, 13, 16, 17 to angularly vibrate. When light emitted from a laser is directed at reflector 10 while the springs are vibrating simultaneously at the high and low frequencies, respectively, a series of substantially horizontal scan lines in the x direction are produced that are displaced in the y direction thereby forming a raster-type scan pattern.

The arrangement of FIG. 3 is advantageously provided of a very simple construction which utilizes only one driver (one coil) for oscillating movement in two directions to form a raster-type scan pattern. There are no shafts or bearings but only flexible metals are used which result in much longer life.

Although the present invention has been described with respect to reading one or two dimensional bar codes, it is not limited to such embodiments, but may also be applicable to more complex indicia scanning applications. It is conceivable that the method of the present invention may also find application for use with various machine vision or optical character recognition applications in which information is derived from other types of indicia such as characters or from the surface characteristics of the article being scanned.

In all of the various embodiments, the elements of the scanner may be assembled into a very compact package that allows the entire scanner to be fabricated as a single printed circuit board or integral module. Such a module can interchangeably be used as the laser scanning element for a variety of different types of data acquisition systems. For example, the module may be alternately used in a hand-held scanner, a table top scanner attached to a flexible armor mounting extending over the surface of the table or attached to the underside of the table top, or mounted as a subcomponent or subassembly of a more sophisticated data acquisiton system. Control or data lines associated with such components may be connected to an electrical connector mounted on the edge or external surface of the module to enable the module to be electrically connected to a mating connector associated with other elements of a data acquisition system.

An individual module may have specific scanning or decoding characteristics associated with it, e.g. operability at a certain working distance, or operability with a specific symbology or printing density. The characteristics may also be defined through the manual setting of control switches associated with the module. The user may also adapt the data acquisition system to scan different types of articles or the system may be adapted for different applications by interchanging modules on the data acquisition system through the use of the simple electrical connector.

The scanning module described above may also be implemented within a self-contained data acquisition system including one or more such components as keyboard, display, printer, data storage, application software, and data bases. Such a system may also include a communications interface to permit the data acquisition system to communicate with other components of a local area network or with the telephone exchange network, either through a modem or an ISDN interface, or by low power radio broadcast from the portable terminal to a stationary receiver.

It will be understood that each of the features described above, or two or more together, may find a useful application in other types of scanners and bar code readers differing from the types described above.

While the invention has been illustrated and described as embodied in a two-dimensional optical scanning arrangement it is not intended to be limited to the details shown, since various modifications and structural changes may be made without departing in any way from the spirit of the present invention.

Without further analysis, the foregoing will so fully reveal the gist of the present invention that others can readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

I claim:

1. An optical scanning arrangement for reading indicia having parts of differing light reflectivity, the arrangement comprising:

a) an oscillatable scanner element;

b) a mounting bracket, the scanner element being mounted for oscillation with respect to the mounting bracket by first and second wires having a relatively high modulus of elasticity, the scanner element having a relatively low inertia when oscillating by elastic movement of the first and second wires; and c) a stationary frame, the mounting bracket being mounted for oscillation with respect to the frame by third and fourth wires having a relatively high modulus of elasticity; the scanner element, mounting bracket and first and second wires taken together having a relatively high inertia when oscillating by elastic movement of the third and fourth wires; and d) driving means arranged to oscillate the scanner element with respect to the mounting bracket at a relatively high frequency of oscillation along a first direction, and the mounting bracket arranged to oscillate with respect to the frame at a relatively low frequency of oscillation along a second direction generally orthogonal to said first direction.

2. A scanner as defined in claim 1, wherein the mounting bracket is a flat, generally rectangularly shaped element.

3. A scanner as defined in claim 1, wherein the scanner element is a planar mirror.

4. A scanner as defined in claim 1, wherein the driving means includes an electromagnetic coil simultaneously driven at first and second frequencies.

5. A scanner comprising:
a) an oscillatable scanner element;
b) a mounting bracket, the scanner element being mounted for torsional oscillation with respect to the mounting bracket by first and second wires having a predetermined modulus of elasticity and extending between the scanner element and the mounting bracket, the scanner element having a relatively low inertia when oscillating by elastic movement of the first and second wires; and
c) a stationary frame, the mounting bracket being mounted for torsional oscillation with respect to the frame by third and fourth wires having a modulus of elasticity different from said predetermined modulus of elasticity and extending between the frame and the mounting bracket; the scanner element, mounting bracket and first and second wires taken together having a relatively high inertia when oscillating by the torsional elastic movement of the third and fourth wires; and
d) driving means arranged to simultaneously oscillate the scanner element with respect to the mounting bracket at a relatively high frequency of oscillation along a first direction, and the mounting bracket with respect to the frame at a relatively low frequency of oscillation along a second direction generally orthogonal to said first direction.

6. An electro-optical scanning component, comprising:
a) a light reflector;
b) means for mounting the reflector with a first spring having a predetermined modulus of elasticity for oscillation about a first axis at a first oscillation frequency;
c) means for mounting the reflector with a second spring having a modulus of elasticity different from said predetermined modulus of elasticity for oscillation about a second axis generally perpendicular to the first axis at a second oscillation frequency different from the first frequency; and
d) drive means for simultaneously oscillating the reflector about both the first and second axes at the first and second oscillation frequencies, respectively due to said different modulii of elasticity.

7. An electro-optical scanning component, comprising:
a) a frame;
b) a scanning assembly having a predetermined moment of inertia;
c) first elongated mounting elements having a predetermined modulus of elasticity and operative for mounting the scanning assembly on the frame for oscillation relative to the frame about a first axis that extends along the first elongated elements;
d) said scanning assembly including a light-reflecting subassembly having a light reflector and a moment of inertia different from said predetermined inertia of said scanning assembly;
e) second elongated mounting elements having a modulus of elasticity different from said predetermined modulus of elasticity and operative for mounting the light-reflecting subassembly on the scanning assembly for oscillation relative to the scanning assembly about a second axis that extends along the second elongated elements and that lies generally perpendicularly to the first axis; and
f) common drive means operatively connected to the scanning assembly for simultaneously oscillating the light reflector at different first and second oscillation frequencies about the first and second axes respectively due to said different moments of inertia and said different modulii of elasticity.

8. The scanning component of claim 7, wherein the light-reflecting subassembly includes a first mounting bracket on which the light reflector is mounted, a second mounting bracket, and third elongated mounting elements extending between the first and second brackets along the second axis.

9. The scanning component of claim 8, wherein the first and second brackets lie in a common plane.

10. The scanning component of claim 9, wherein the first and second brackets have generally rectangular configurations.

11. The scanning component of claim 8, wherein the third mounting elements are co-linear torsion wires having opposite ends anchored in the first and second brackets.

12. The scanning component of claim 9, wherein the scanning assembly includes a third mounting bracket lying in said common plane with the first and second brackets.

13. The scanning component of claim 12, wherein the second mounting elements are co-linear torsion wires having opposite ends anchored in the second and third brackets.

14. The scanning component of claim 12, wherein the first mounting elements are co-linear torsion wires having opposite ends anchored in the third bracket and the frame.

15. The scanning component of claim 7, wherein the drive means includes an electromagnetic coil mounted on the frame, and having a reciprocating drive element operatively connected to the scanning assembly.

16. The scanning component of claim 7, wherein the first oscillation frequency lies in a range of 5 to 100 Hz, and wherein the second oscillation frequency lies in a range of 200–800 Hz.

* * * * *